(12) United States Patent
Broyde et al.

(10) Patent No.: US 7,408,426 B2
(45) Date of Patent: Aug. 5, 2008

(54) METHOD AND DEVICE FOR TRANSMISSION WITHOUT CROSSTALK

(75) Inventors: Frederic Broyde, Maule (FR); Evelyne Clavelier, Maule (FR)

(73) Assignee: Zxtalk Assets, LLC, Wilmington, DE (US)

( * ) Notice: Subject to any disclaimer, the term of this patent is extended or adjusted under 35 U.S.C. 154(b) by 308 days.

(21) Appl. No.: 10/547,088

(22) PCT Filed: Feb. 18, 2004

(86) PCT No.: PCT/EP2004/002383

§ 371 (c)(1),
(2), (4) Date: Aug. 26, 2005

(87) PCT Pub. No.: WO2004/082168

PCT Pub. Date: Sep. 23, 2004

(65) Prior Publication Data

US 2006/0192429 A1   Aug. 31, 2006

(30) Foreign Application Priority Data

Mar. 13, 2003   (FR) .................................. 03 03087

(51) Int. Cl.
H01P 5/12 (2006.01)
H03K 17/16 (2006.01)
H04B 1/10 (2006.01)

(52) U.S. Cl. .......................... 333/100; 333/12; 326/30; 345/58; 327/379; 327/551

(58) Field of Classification Search .................. 333/12, 333/100; 326/30; 345/58; 327/379, 551
See application file for complete search history.

(56) References Cited

U.S. PATENT DOCUMENTS

| 5,220,211 | A | * | 6/1993 | Christopher et al. ......... 326/90 |
| 5,278,536 | A |  | 1/1994 | Furtaw et al. |
| 5,644,252 | A | * | 7/1997 | Watarai ....................... 326/27 |
| 6,970,011 | B2 | * | 11/2005 | Arnold ........................ 326/32 |
| 7,167,019 | B2 | * | 1/2007 | Broyde et al. ................. 326/30 |
| 7,208,888 | B2 |  | 4/2007 | Lovato et al. |
| 2002/0167701 | A1 |  | 11/2002 | Hirata |

(Continued)

FOREIGN PATENT DOCUMENTS

EP          0756397          1/1997

(Continued)

OTHER PUBLICATIONS

Abushaaban et al., Modal Circuit Decomposition of Lossy Multiconductor Transmission Lines, IEEE Transactionson Microwave Theory and Techniques, IEEE Inc. (New York), vol. 44 (No. 7), pp. 1046-1056, (Jul. 1, 1996).

(Continued)

*Primary Examiner*—Robert J. Pascal
*Assistant Examiner*—Kimberly E Glenn
(74) *Attorney, Agent, or Firm*—Howrey LLP

(57) ABSTRACT

The invention relates to a method and a device for transmission without crosstalk in interconnections used for sending a plurality of signals, such as the interconnections made with flat multiconductor cables, or with the tracks of a printed circuit board, or inside an integrated circuit. An interconnection with four parallel transmission conductors plus a reference conductor has each of its ends connected to a termination circuit. The transmitting circuit receives at its input the signals of the four channels of the source and its output terminals are connected to the conductors of the interconnection. The receiving circuit(s) input terminals are connected to the conductors of the interconnection, and its four output channels are connected to the destination. The signals of the four channels of an active source are sent to the four channels of the destination, without noticeable crosstalk.

16 Claims, 2 Drawing Sheets

U.S. PATENT DOCUMENTS

2005/0135811 A1    6/2005  Lee et al.
2006/0171476 A1*   8/2006  Broyde et al. ............... 375/257
2007/0117446 A1*   5/2007  Broyde et al. ............... 439/404

FOREIGN PATENT DOCUMENTS

| EP | 1 109 328 A | 6/2001 |
| EP | 1564914 | 8/2005 |
| GB | 2392586 | 3/2004 |
| JP | 2004147063 | 5/2004 |
| WO | WO99/41876 | 8/1999 |
| WO | WO 00/40892 | 7/2000 |

OTHER PUBLICATIONS

El-Zein et al., An analytical method for finding the maximum crosstalk in lossless-coupled transmission lines, Proceedings of the IEEE International Conference, pp. 443-448, (Nov. 8, 1992).

Scott, Propagation over multiple parallel transmission lines via modes, IBM Technical Disclosure Bulletin, IBM Corp. (New York), vol. 32 ( No. 11), pp. 1-6, (Apr. 1, 1990).

Guo-Lin Li et al., Lin-modes decomposition of three-conductor transmission lines, Microwave Conference, 2000 Asia-Pacific, IEEE (Sydney, Australia), pp. 1031-1034, (Dec. 3, 2000).

Toshihiko Komine and Masao Nakagawa, "Integrated System of White Led Visible-Light Communication and Power-Line Communication" dep. of Inform. and Computer Science, Keio Univ., pp. 1762-1766, PIMRC 2002.

* cited by examiner

METHOD AND DEVICE FOR TRANSMISSION WITHOUT CROSSTALK

CROSS REFERENCE TO RELATED APPLICATIONS

This is the U.S. National Phase of PCT/EP2004/002383, filed Feb. 18, 2004, which in turn claims priority to French Application No. 03/03087, filed Mar. 13, 2003, both of which are incorporated herein in their entirety by reference.

FIELD OF THE INVENTION

The invention relates to a method and a device for transmission without crosstalk through interconnections used for sending a plurality of signals, such as the ones made with flat multiconductor cables, or with the tracks of a printed circuit board, or inside an integrated circuit.

The French patent application number 0303087 of 13 Mar. 2003, entitled "Procédé et dispositif pour la transmission sans diaphonie" is incorporated by reference.

PRIOR ART

Let us consider the theoretical problem of an interconnection with n transmission conductors placed close to a reference conductor. Let us number these conductors from 0 to n, where 0 is the "reference conductor" which will be used as a reference for measuring voltages, and which is often called the ground conductor.

We define any point along an interconnection of length L with a real curvilinear abscissa z, the interconnection extending from z=0 to z=L.

Any integer j greater than or equal to 1 and less than or equal to n corresponds to the number of a transmission conductor of the interconnection, that is to say to a conductor other than the reference conductor. This integer may therefore be used as an index in order to define, for each transmission conductor, two electrical variables, i.e. one current and one voltage. At a given abscissa z along the cable, we define in this manner the current $i_j$ flowing in the transmission conductor, and the voltage $v_j$ between the transmission conductor and the reference conductor. These n currents and these n voltages are respectively called natural currents and natural voltages. The wording "natural electrical variable" will indiscriminately designate a natural current or a natural voltage.

The vocabulary and the definitions which we will use are those of the French patent application number 0300064 of 6 Jan. 2003, entitled "Procédé et dispositif pour la transmission avec une faible diaphonie", and of the international application number PCT/EP03/15036 of 24 Dec. 2003, entitled "Method and device for transmission with reduced crosstalk". In particular, the following definitions and wordings are concerned:
- "multiconductor transmission line",
- "per-unit-length inductance matrix" or "L matrix",
- "per-unit-length resistance matrix" or "R matrix",
- "per-unit-length capacitance matrix" or "C matrix",
- "per-unit-length conductance matrix" or "G matrix",
- "per-unit-length impedance matrix" or "matrix",
- "per-unit-length admittance matrix" or "Y matrix",
- "uniform multiconductor transmission line",
- "column-vector I of the natural currents $i_1, \ldots, i_n$",
- "column-vector V of the natural voltages $v_1, \ldots, v_n$",
- "telegrapher's equations",
- "modal current",
- "modal voltage",
- "column-vector $I_M$ of the modal currents $i_{M1}, \ldots, i_{Mn}$",
- "column-vector $V_M$ of the modal voltages $v_{M1}, \ldots, v_{Mn}$",
- "transition matrix from modal voltages to natural voltages" or "S matrix",
- "transition matrix from modal currents to natural currents" or "T matrix",
- "modal electrical variable",
- "transition matrix from modal electrical variables to natural electrical variables",
- "characteristic impedance matrix" or "$Z_C$ matrix",
- "propagation constant" for a mode.

The prior art applicable to this application includes: the prior art presented in the above-mentioned French patent application no. 0300064 and international application no. PCT/EP03/15036, the invention described in them, and the invention described in the French patent application no. 0302814 of 6 Mar. 2003, entitled "Procédé et dispositif numériques pour la transmission avec une faible diaphonie".

The inventions presented in the above-mentioned French patent applications no. 0300064 and no. 0302814 indeed allow reducing crosstalk efficiently, and are applicable to both analog and digital signals. However, for combining in a transmitting circuit the m input signals, according to linear combinations defined by a transition matrix from modal electrical variables to natural electrical variables, in order to obtain at the output of the transmitting circuit the generation of modal electrical variables, and for combining in a receiving circuit, the input of which is connected to the n transmission conductors, the signals present on the transmission conductors, according to linear combinations defined by the inverse of the transition matrix from modal electrical variables to natural electrical variables, so as to obtain at the output of the receiving circuit m output signals each corresponding to one of the transmission channels, each output signal being proportional to a single modal electrical variable, analog circuits or digital circuits are necessary. These circuits entail a cost, and possibly a limitation of the passband.

DESCRIPTION OF THE INVENTION

The purpose of the method of the invention is the transmission without crosstalk through interconnections with two or more transmission conductors, without the limitations of known techniques.

The invention is about a method for transmitting through an interconnection with n transmission conductors and a reference conductor, n being an integer greater than or equal to 2, the method providing, in a known frequency band, m transmission channels each corresponding to a signal to be sent from the input of at least one transmitting circuit to the output of at least one receiving circuit, where m is an integer greater than or equal to 2 and less than or equal to n, the method comprising the steps of:

proportioning the interconnection, taking into account the lumped impedances seen by the interconnection and caused by the circuits connected to the interconnection elsewhere than at the ends of the interconnection, so as to be able to model the interconnection as a multiconductor transmission line having uniform electrical characteristics over its length for the known frequency band, the electrical characteristics being such that the propagation constants of the different propagation modes may be considered as substantially equal in the known frequency band;

determining the characteristic impedance matrix of the multiconductor transmission line in the known frequency band;

placing at both ends of the interconnection a termination circuit having an impedance matrix approximating the characteristic impedance matrix;

using one of the transmitting circuits to which the m input signals are applied, so as to obtain at the output of said one of the transmitting circuits, output being connected to at least m transmission conductors among the transmission conductors, the generation of natural electrical variables, each being proportional to a single signal among the input signals; and using one of the receiving circuits, the input of which is connected to at least m transmission conductors among the transmission conductors, so as to obtain, at the output of said one of the receiving circuits, m output signals each corresponding to one of the transmission channels, each output signal being proportional to a single natural electrical variable among said natural electrical variables.

According to the method of the invention, the interconnection is proportioned in such a way that the propagation constants of the different propagation modes may be regarded as equal in the known frequency band. Let γ be the common value of the propagation constants, which may be frequency-dependent. The equations (2) and (3) of the above-mentioned French patent application no. 0300064 and international application no. PCT/EP03/15036 become:

$$\begin{cases} T^{-1}YZT = \gamma^2 I_n \\ S^{-1}ZYS = \gamma^2 I_n \end{cases} \quad (1)$$

where $I_n$ is the identity matrix of order n. Therefore, we have:

$$YZ = ZY = \gamma^2 I_n \quad (2)$$

As a consequence, the transition matrix from modal electrical variables to natural electrical variables may be chosen equal to the identity matrix of order n. However, it is important to note that some properties are related to the choice of associated S and T matrices, that is to say matrices such that $$S = j\omega c_K Y^{-1} T \quad (3)$$

where $c_K$ is an arbitrary scalar different from zero, which may depend on the frequency, and which has the dimensions of a per-unit-length capacitance. As a consequence, when we consider associated S and T matrices, only one of the two matrices may be arbitrarily chosen.

According to the method of the invention, said natural electrical variables may be either all voltages or all electric currents. For reasons presented in the above-mentioned French patent application no. 0300064 and international application no. PCT/EP03/15036, and related to the use of associated S and T matrices, it is physically equivalent that a transmitting circuit "generates modal voltages on the transmission conductors, where each modal voltage is proportional to only one of the input signals", or that it "generates modal currents on the transmission conductors, where each modal current is proportional to only one of the input signals", and it is physically equivalent that a receiving circuit delivers at its output "m output signals each corresponding to one of the transmission channels, where each output signal is proportional to only one of the modal voltages", or that it delivers at its output "m output signals each corresponding to one of the transmission channels, where each output signal is proportional to only one of the modal currents".

According to the method of the invention, once the use of voltages or currents for the natural electrical variables is decided upon, we may consider that the corresponding transition matrix from modal electrical variables to natural electrical variables has been chosen equal to the identity matrix of order n: this choice allows to consider the chosen natural electrical variables as modal electrical variables. However, this choice applies either to the modal voltages or to the modal currents.

The person skilled in the art fully understands the principles implemented by the invention. As in the above-mentioned French patent application no. 0300064 and international application no. PCT/EP03/15036, it uses a superposition of waves being each composed of a single modal electric variable corresponding to a channel, because the properties of these waves, produced with a suitable conversion in one of the transmitting circuits and used with an inverse conversion in one of the receiving circuits, enable transmission without crosstalk between the channels. However, the natural electrical variables being modal electrical variables, it is not necessary, for implementing the method of the invention, to produce linear combinations both in the transmitting circuits and in the receiving circuits, as explained below.

Thus, requiring substantially equal propagation constants in the known frequency band for the different propagation modes allows simplifying the transmitting circuits and/or the receiving circuits. This requirement was not mentioned in the above-mentioned French patent application no. 0300064 nor in the international application no. PCT/EP03/15036. However, the subject matter of this simplification of the transmitting circuits and/or the receiving circuits is subtle. It will be discussed in detail below.

We note that, as explained in the above-mentioned French patent application no. 0300064 and international application no. PCT/EP03/15036, and since a termination circuit is arranged at both ends of the interconnection, there is neither near-end crosstalk nor far-end crosstalk. Thus, the invention is appropriate for an interconnection on which signals propagate in the direction of increasing z and the direction of decreasing z, without noticeable crosstalk.

As in the above-mentioned French patent application no. 0300064 and international application no. PCT/EP03/15036, in order that this principle results in the desired characteristics, it is important that the interconnection behaves like a multiconductor transmission line uniform over its length, because a lack of homogeneity such as a variation of the characteristic impedance matrix with respect to z may produce detrimental couplings between the channels, that is to say, crosstalk.

In some cases, in order to take into account the lumped impedances seen by the interconnection and caused by the circuits connected to it elsewhere than at its ends, the designer need only observe that they are not present or that they may be ignored. In other cases, in order to take into account the lumped impedances seen by the interconnection and caused by the circuits connected to it elsewhere than at its ends, the designer must quantitatively consider these lumped impedances to obtain a multiconductor transmission line having sufficiently uniform electrical characteristics over its length. For instance, the interconnection could see a receiving circuit as a capacitance matrix adding to its own capacitance matrix: this lumped capacitance could therefore be offset by a suitably proportioned local modification of the geometrical characteristics of the interconnection in the vicinity of the connection point. As a second example, capacitance matrices localized at connection points regularly spaced along the interconnection could be taken into account to obtain a prescribed average per-unit-length capacitance matrix relevant up to a given maximum frequency, by using suitably proportioned transmission conductors.

Moreover, we have to determine in which circumstances it is possible to consider the propagation constants of the different propagation modes as equal in the known frequency band, since this requirement is necessary for implementing the method of the invention. Firstly, we note that this circumstance is equivalent to the equation (2).

The specialist, considering for example the results presented in paragraphs § 2.4 and § 4.4.1 in the book *Analysis of Multiconductor Transmission Lines* by C. R. Paul, published by John Wiley & Sons in 1994, understands that this requirement can for instance be met in the case where the four following characteristics are simultaneously obtained:

the lumped impedances seen by the interconnection and caused by the circuits connected to it elsewhere than at its ends may be ignored, losses may be ignored, the field lines of the electric field produced by the interconnection essentially see a medium of homogeneous permittivity, and the field lines of the magnetic field produced by the interconnection essentially see a medium of homogeneous permeability.

In particular, the last two characteristics are obtained when the proportioning of the interconnection is such that, in a section of the interconnection in a plane orthogonal to the direction of propagation, the medium surrounding the conductors has homogeneous permittivity and permeability, up to a sufficient distance from the conductors.

In particular, the last two characteristics may be obtained when the proportioning of the interconnection is such that, in a section of the interconnection in a plane orthogonal to the direction of propagation, the reference conductor completely or almost completely surrounds the transmission conductors, and the medium surrounding the transmission conductors inside the reference conductor has homogeneous permittivity and permeability. For instance, in a multilayer printed circuit board made of dielectrics having homogeneous electrical characteristics, the transmission conductors could be the traces of an internal layer, the layers immediately above and immediately below this internal layer being used as ground planes that together constitute the reference conductor.

It is also possible to use lumped impedances seen by the interconnection and caused by the circuits connected to it elsewhere than at its ends to obtain a multiconductor transmission line such that the propagation constants for its propagation modes are substantially equal in the known frequency band. For instance, if we consider that the Z matrix is defined by the geometry of the conductors of the interconnection, it is possible to use lumped capacitances arranged along the interconnection, between some of its conductors, to obtain a Y matrix such that equation (2) is satisfied with enough accuracy, up to a given maximum frequency.

According to the invention, the signals to be sent may be analog or digital signals.

According to the invention, the natural electrical variables generated by a transmitting circuit are each proportional to a single signal among the input signals. Since m signals must be sent, there are at least m natural electrical variables. According to the method of the invention, it is possible, in particular, to obtain the generation of m natural electrical variables at the output of a transmitting circuit. This may be the most economical procedure. However, it is also conceivable, when m is less than n, that more than m natural electrical variables are generated for the m input signals.

According to the method of the invention, the number m of transmission channels between any one of the transmitting circuits and any one of the receiving circuits may be equal to the number n of transmission conductors. This method is preferred because it is generally the most economical. However, it is also conceivable to use a number n of transmission conductors, greater than the number m of channels.

According to the method of the invention, the interconnection maybe such that n is greater than or equal to three.

According to the method of the invention, conductors and dielectrics may be used such that the section of the interconnection in a plane orthogonal to the direction of propagation does not change, except for a scale factor, over the greatest part of the length of the interconnection, in the vicinity of the transmission conductors. The person skilled in the art knows that this condition indeed allows maintaining practically uniform electrical characteristics over the length of the interconnection.

Note that, in many possible cases, as the person skilled in the art knows, we can consider that, when computing the matrix $Z_c$ of the multiconductor transmission line, the losses are negligible in some frequency bands, for instance for frequencies greater than 100 kHz, and that in this case, the characteristic impedance matrix is real and frequency-independent. However, in the case of interconnections inside integrated circuits (on-chip interconnects) we note that, because of the small cross-section of the conductors, this result might be obtained only at much higher frequencies, for instance at frequencies higher than 1 GHz.

The person skilled in the art knows, for instance, from a computation based on the geometry of the conductors and insulators, on the conductivity of the conductors and on the permittivity and the losses of the insulators, how to determine the natural matrices L, R, C and G of a multiconductor transmission line, as a function of frequency. The person skilled in the art also knows how to measure these matrices. It is therefore clear that it is possible to accurately determine the characteristic impedance matrix of the multiconductor transmission line in any frequency interval, up to the maximum frequency for which the transmission line theory is applicable. This maximum frequency depends on the cross dimensions of the interconnection, and the person skilled in the art knows that it corresponds to the appearance of the first non-evanescent propagation modes other than the quasi-TEM modes. In this same frequency interval, it is obviously also possible to determine whether the condition (2) is met with sufficient accuracy, and whether the propagation constants of the different propagation modes may be considered as substantially equal in the known frequency band.

The characteristic impedance matrix may therefore be determined, for instance, in two distinct contexts: firstly when the interconnection has been chosen and the method of the invention must be applied to the interconnection by adapting the other parts of a device implementing this method, secondly when the parts of a device implementing this method, other than the interconnection, have been defined beforehand, and an appropriate interconnection should be designed.

A device for proportioning the circuits used in a method of the invention is described in the next sentence. A device for proportioning the circuits used in a method for transmitting through an interconnection with n transmission conductors and a reference conductor, n being an integer greater than or equal to 2, the method providing, in a known frequency band, m transmission channels each corresponding to a signal to be sent from the input of at least one transmitting circuit to the output of at least one receiving circuit, where m is an integer greater than or equal to 2 and less than or equal to n, may comprise:

- means for proportioning the interconnection, taking into account the lumped impedances seen by the interconnection and caused by the circuits connected to the interconnection elsewhere than at the ends of the interconnection, so as to be able to model the interconnection as a multiconductor transmission line having uniform electrical characteristics over its length for the known frequency band, the electrical characteristics being such that the propagation constants of the different propagation modes may be considered as substantially equal in the known frequency band;
- means for determining the characteristic impedance matrix of the multiconductor transmission line in the known frequency band;
- means for proportioning a termination circuit having an impedance matrix approximating the characteristic impedance matrix;
- means for proportioning one of the transmitting circuits to which the m input signals are applied, so as to obtain at the output of said one of the transmitting circuits, output being connected to at least m transmission conductors among the transmission conductors, the generation of natural electrical variables, each being proportional to a single signal among the input signals; and
- means for proportioning one of the receiving circuits, the input of which is connected to at least m transmission conductors among the transmission conductors, so as to obtain, at the output of said one of the receiving circuits, in output signals each corresponding to one of the transmission channels, each output signal being proportional to a single natural electrical variable among said natural electrical variables.

The device for proportioning the circuits used in a method of the invention may be such that the means for modeling the interconnection comprise means for measuring and/or for computing the real electrical characteristics of the interconnection, based on the relative layout of the transmission conductors and the reference conductor, and on the characteristics of the dielectrics surrounding them.

The device for proportioning the circuits used in a method of the invention may be such that the means for modeling the interconnection comprise:

- means for calculating one or more error coefficients for variance between the actual electrical characteristics of the interconnection and the desired characteristics, for the known frequency band; and
- means for optimizing the relative position of the transmission conductors and/or the dielectrics surrounding them, by minimizing the error coefficient or coefficients.

A device for implementing the method of the invention is described in the next sentence.

A device for transmission providing, in a known frequency band, in transmission channels each corresponding to a signal to be sent from the input of at least one transmitting circuit to the output of at least one receiving circuit, where m is an integer greater than or equal to 2, comprises:

- an interconnection with n transmission conductors and a reference conductor, n being an integer greater than or equal to m, the interconnection being proportioned in such a way that the interconnection may, taking into account the lumped impedances seen by the interconnection and caused by the circuits connected to the interconnection elsewhere than at the ends of the interconnection, be modeled as a multiconductor transmission line having uniform electrical characteristics over its length for the known frequency band, the electrical characteristics being such that the propagation constants of the different propagation modes may be considered as substantially equal in the known frequency band;
- two termination circuits, each arranged at a different end of the interconnection and each having, in the known frequency band, an impedance matrix approximating the characteristic impedance matrix of the multiconductor transmission line;
- at least one of the transmitting circuits to which the m input signals are applied, so as to obtain at the output of said one of the transmitting circuits, output being connected to at least m transmission conductors among the transmission conductors, the generation of natural electrical variables, each being proportional to a single signal among the input signals; and
- at least one of the receiving circuits, the input of which is connected to at least m transmission conductors among the transmission conductors, so as to obtain, at the output of said one of the receiving circuits, m output signals each corresponding to one of the transmission channels, each output signal being proportional to a single natural electrical variable among said natural electrical variables.

In a device for implementing the method of the invention, said natural electrical variables may be either all voltages or all electric currents.

In a device for implementing the method of the invention, it is possible to obtain the generation of m natural electrical variables at the output of a transmitting circuit.

In a device for implementing the method of the invention, it is possible that the number m of transmission channels between any one of the transmitting circuits and any one of the receiving circuits is equal to the number n of transmission conductors.

A device for implementing the method of the invention may in particular be such that n is greater than or equal to three.

According to the invention, it is specified that it must be possible to model the interconnection as a multiconductor transmission line having uniform electrical characteristics over its length for the known frequency band, taking into account the lumped impedances seen by the interconnection and caused by the circuits connected to it elsewhere than at its ends. In order to take these lumped impedances into account by merely stating that they are not present or that they may be ignored, these circuits must be such that they do not disturb the propagation along the multiconductor transmission line. The person skilled in the art sees that this result can for instance be obtained by:

- using transmitting circuits and/or receiving circuits connected in series with the conductors of the interconnection, and showing a low series impedance,
- using transmitting circuits and/or receiving circuits connected in parallel with the conductors of the interconnection, and showing a high parallel impedance.

A device for implementing the method of the invention may therefore be such that the transmitting circuit(s) and/or the receiving circuit(s) are connected in parallel with the interconnection, and such that the interconnection sees a high impedance in the connections of the transmitting circuit(s) and/or the receiving circuit(s).

However, the connection of the transmitting circuits and/or the receiving circuits in parallel with the interconnection is not at all a characteristic of the invention. According to the invention, the transmitting circuit(s) and/or the receiving circuit(s) may be connected in series with the interconnection, in which case they must generally show a low series impedance to the interconnection, in order not to disturb the propagation of waves along the interconnection.

Let us now consider the case where m=n. Let $X_I$ be the column-vector of the n input signals $x_{I\,1}, \ldots, x_{I\,n}$ of a transmitting circuit, and let $X_O$ be the column-vector of the n output signals $x_{O\,1}, \ldots, x_{O\,n}$ of a receiving circuit. These signals may be voltages or currents.

Let us now for instance assume that the electrical variables mentioned in the wording of the invention are voltages. In this case, the matrix S is the identity matrix of order n, and the modal voltages are therefore natural voltages. According to the invention, at any frequency in the known frequency band, there is a proportionality between each natural voltage produced by a transmitting circuit and the input signal of the corresponding channel. Using a suitable numbering of the input signals, we may therefore write:

$$V = \text{diag}_n(\alpha_1, \ldots, \alpha_n) X_I \tag{4}$$

where V is the column-vector of the natural voltages produced by the transmitting circuit, and $\text{diag}_n(\alpha_1, \ldots, \alpha_n)$ is the diagonal matrix of the non-zero proportionality coefficients $\alpha_i$. The dimensions of each of these coefficients depend upon the dimensions of the input signals; if for instance these input signals are voltages, the coefficients $\alpha_i$ will be dimensionless.

The equation (4) is the one which would naturally be used to define a transmitting circuit connected in series with the conductors of the interconnection, and presenting a low series impedance to the interconnection. The designer may on the contrary prefer to define a transmitting circuit connected in parallel with the conductors of the interconnection, and showing a high parallel impedance to the interconnection. She/he might then prefer to consider that the transmitting circuit operates as a set of current sources. If we use I to denote the column-vector of the natural currents injected by the transmitting circuit, we have to consider that, since the device for implementing the method of the invention is such that both ends of the interconnection are connected to a termination circuit with an impedance matrix near the characteristic impedance matrix, the output of the transmitting circuit sees an impedance matrix near $Z_C/2$, and therefore $$I = 2Z_C^{-1} \text{diag}_n(\alpha_1, \ldots, \alpha_n) X_I \tag{5}$$

We therefore see that, according to equation (5), the transmitting circuit must combine the input signals according to linear combinations.

Moreover, given that according to the invention, for each channel, a receiving circuit produces at its output a signal practically proportional to the natural voltage corresponding to the channel, we may, with a suitable numbering of the output signals, write that:

$$X_O = \text{diag}_n(\beta_1, \ldots, \beta_n) V \tag{6}$$

where V is the column-vector of the natural voltages received by the receiving circuit, and $\text{diag}_n(\beta_1, \ldots, \beta_n)$ is the diagonal matrix of the non-zero proportionality coefficients $\beta_i$. The dimensions of these coefficients depend upon the dimensions of the output signals: if for instance the output signals are currents, $\beta_i$ will have the dimensions of admittance.

In the case currently being considered where the matrix S is the identity matrix of order n, a receiving circuit could for instance be connected in parallel with the conductors of the interconnection, show a high parallel impedance to the interconnection, and directly acquire the natural voltages on the transmission conductors.

In the case currently being considered where the matrix S is the identity matrix of order n, a receiving circuit could also for instance be connected in series with the conductors of the interconnection, show a low series impedance to the interconnection, and acquire the natural currents on the transmission conductors. If we use I to denote the column-vector of the natural currents measured by the receiving circuit, we have $$X_O = \pm \text{diag}_n(\beta_1, \ldots, \beta_n) Z_C I \tag{7}$$

We therefore see that, according to equation (7), the receiving circuit must combine its input signals according to linear combinations.

This ends the discussion of the case where the electrical variables mentioned in the wording of the invention are voltages.

Let us now consider the case where the electrical variables mentioned in the wording of the invention are currents. In this case, the matrix T is the identity matrix of order n, and the modal currents are therefore natural currents. According to the invention, at any frequency in the known frequency band, there is a proportionality between each natural current produced by a transmitting circuit and the input signal of the corresponding channel. Using a suitable numbering of the input signals, we may therefore write:

$$I = \text{diag}_n(\alpha_1, \ldots, \alpha_n) X_I \tag{8}$$

where I is the column-vector of the natural currents produced by the transmitting circuit, and $\text{diag}_n(\alpha_1, \ldots, \alpha_n)$ is the diagonal matrix of the non-zero proportionality coefficients $\alpha_i$. The dimensions of each of these coefficients depend upon the dimensions of the input signals; if for instance these input signals are voltages, the coefficients $\alpha_i$ will have the dimensions of admittance.

The equation (8) is the one which would naturally be used to define a transmitting circuit connected in parallel with the conductors of the interconnection, and presenting a high parallel impedance to the interconnection. The designer may on the contrary prefer to define a transmitting circuit connected in series with the conductors of the interconnection, and showing a low series impedance to the interconnection. She/he might then prefer to consider that the transmitting circuit operates as a set of voltage sources. If we use V to denote the column-vector of the natural voltages applied by the transmitting circuit, we have to consider that, since the device for implementing the method of the invention is such that both ends of the interconnection are connected to a termination circuit with an impedance matrix near the characteristic impedance matrix, the output of the transmitting circuit sees an impedance matrix near $2Z_C$, and therefore $$V = 2Z_C \text{diag}_n(\alpha_1, \ldots, \alpha_n) X_I \tag{9}$$

We therefore see that, according to equation (9), the transmitting circuit must combine the input signals according to linear combinations.

Moreover, given that according to the invention, for each channel, a receiving circuit produces at its output a signal practically proportional to the natural current corresponding to the channel, we may, with a suitable numbering of the output signals, write that:

$$X_O = \text{diag}_n(\beta_1, \ldots, \beta_n) I \tag{10}$$

where I is the column-vector of the natural voltages received by the receiving circuit, and $\text{diag}_n(\beta_1, \ldots, \beta_n)$ is the diagonal matrix of the non-zero proportionality coefficients $\beta_i$. The dimensions of these coefficients depend upon the dimensions of the output signals: if for instance the output signals are currents, $\beta_i$ will be dimensionless.

In the case currently being considered where the matrix T is the identity matrix of order n, a receiving circuit could for instance be connected in series with the conductors of the interconnection, show a low series impedance to the interconnection, and directly acquire the natural currents on the transmission conductors.

In the case currently being considered where the matrix T is the identity matrix of order n, a receiving circuit could also for instance be connected in parallel with the conductors of the interconnection, show a high parallel impedance to the interconnection, and acquire the natural voltages on the transmission conductors. If we use V to denote the column-vector of the natural voltages measured by the receiving circuit, we have $$X_O = \pm \mathrm{diag}_n(\beta_i, \ldots, \beta_n) Z_C^{-1} V \qquad (11)$$

We therefore see that, according to equation (11), the receiving circuit must combine its input signals according to linear combinations.

This ends the discussion of the case where the electrical variables mentioned in the wording of the invention are currents.

Given that, according to the invention, the waves propagate on the interconnection as they would in a uniform multiconductor transmission line, without significant reflection at the ends, and without coupling between the natural electrical variables mentioned in the wording of the invention (since they are also modal electrical variables), it is possible, using equations (4) and (6) or the equations (8) and (10), to clarify how the transmission of signals takes place. Between a transmitting circuit and a receiving circuit whose connection points to the interconnection show a difference of curvilinear abscissa $\Delta L$, for any integer i between 1 and n included, we obtain:

$$x_{O\,i} = \alpha_i \beta_i e^{-\gamma|\Delta L|} x_{I\,i} \qquad (12)$$

where $\gamma$ is the propagation constant common to the different propagation modes.

It is interesting to examine in which case it is necessary to perform non-trivial linear combinations of signals in the transmitting circuits and/or in the receiving circuits, a linear combination being called "trivial" when it is merely the product of only one signal and a coefficient. Linear combinations which could be non-trivial appear in the equations (5), (7), (9) and (11), whereas the linear combinations of the equations (4), (6), (8) and (10) are trivial. Non-trivial linear combinations are used in the above-mentioned French patent application no. 0300064 and international application no. PCT/EP03/15036, and these applications provide examples of implementations based on analog circuits performing an analog signal processing. We note that the above-mentioned French patent application no. 0302814 of 6 Mar. 2003 provides examples of implementation based on digital circuits performing a digital signal processing.

According to the invention, linear combinations of signals may be performed in at least one of the transmitting circuits and/or in at least one of the receiving circuits, using an analog processing.

According to the invention, linear combinations of signals may be performed in at least one of the transmitting circuits and/or in at least one of the receiving circuits, using a digital processing.

According to the invention, the digital processing performed in at least one transmitting circuit and/or the digital processing performed in at least one receiving circuit may be defined by a program.

A device of the invention may be such that the termination circuits, the transmitting circuit(s), and the receiving circuit(s) are without any part in common to any two of them.

Conversely, a device of the invention may be such that the termination circuits, the transmitting circuit(s), and the receiving circuit(s) are not without a part or parts in common to any two of them. This possibility has been discussed in the presentation of the fourth, fifth and sixth embodiments provided as examples in the above-mentioned French patent application no. 0300064 and international application no. PCT/EP03/15036.

Connecting the receiving circuits and the transmitting circuits in parallel with the interconnection is simpler than connecting them in series. Connecting the receiving circuits and the transmitting circuits in parallel is therefore a priori preferred. If the designer wishes to build a device for implementing the method of the invention in which the receiving circuits and the transmitting circuits are connected in parallel with the interconnection and such that the interconnection sees a high impedance in the connections of the transmitting circuit(s) and the receiving circuit(s), we see that she/he may:

when designing the transmitting circuits, use for instance equation (5) in which case the matrix S is chosen equal to the identity matrix of order n, or use for instance equation (8) in which case the matrix T is chosen equal to the identity matrix of order n, and when designing the receiving circuits, use for instance equation (6) in which case the matrix S is chosen equal to the identity matrix of order n, or use for instance equation (11) in which case the matrix T is chosen equal to the identity matrix of order n.

Whether the matrix S or the matrix T is chosen equal to the identity matrix of order n, since this choice, according to equation (3) must be the same for the receiving circuits and the transmitting circuits, we see that, in these examples, either the transmitting circuits must perform non-trivial linear combinations of the input signals, or the receiving circuits must perform non-trivial linear combinations of the signals present on the transmission conductors.

There is a cost factor involved in performing non-trivial linear combinations in the receiving circuits and/or transmitting circuits. If the designer wishes to build a device for implementing the method of the invention in which neither the transmitting circuits nor the receiving circuits perform non-trivial linear combinations, we see that she/he may:

when designing the transmitting circuits, use for instance equation (4) in which case the matrix S is chosen equal to the identity matrix of order n, or use for instance equation (8) in which case the matrix T is chosen equal to the identity matrix of order n;

when designing the receiving circuits, use for instance equation (6) in which case the matrix S is chosen equal to the identity matrix of order n, or use for instance equation (10) in which case the matrix T is chosen equal to the identity matrix of order n.

Whether the matrix S or the matrix T is chosen equal to the identity matrix of order n, since this choice, according to equation (3) must be the same for the receiving circuits and the transmitting circuits, we see that, in these examples, either the transmitting circuits or the receiving circuits must be connected in series with the interconnection, and present a low series impedance to the interconnection.

In a device for implementing the method of the invention, it is possible that the section of the interconnection in a plane orthogonal to the direction of propagation does not change, except for a scale factor, over the greatest part of the length of the interconnection, in the vicinity of the transmission conductors.

A device for implementing the method of the invention may preferentially be such that the known frequency band contains frequencies between 100 kHz and 100 GHz.

We have already mentioned that it is often possible, for instance at frequencies greater than 100 kHz, to obtain a real and frequency-independent matrix $Z_C$. In this case, it is clear for the person skilled in the art that a termination circuit having, in the known frequency band, an impedance matrix approximating the characteristic impedance matrix, could for instance be made of a network of resistors, and the computations needed to proportion this network are not difficult.

A device for implementing the method of the invention may be such that the termination circuits are made of a network of resistors.

Termination circuits made of a network of resistors are however not at all a characteristic of the invention. By way of example, designers may, in order to limit the power consumed by a signal present at the terminals of termination circuits, choose to allow these terminals to be effective only in a relevant interval of frequency, for instance by including suitable reactive circuit elements in the termination circuits. Another example is that terminations circuits could include active circuit elements.

In the case where it may be useful to take losses into account when determining the matrix $Z_C$, this matrix is not real and frequency-independent any longer, and it becomes necessary to synthesize the termination circuits, using methods well known to the persons skilled in the art, such that the synthesized circuits include reactive circuit elements.

In the case where the chosen coefficients $\alpha_i$ and $\beta_i$ of equations (4) to (13) are real and frequency-independent, it is clear that the transmitting circuits and the receiving circuits do not have to perform a filtering function. In this case, the specialist sees that, when the transmitting circuits and/or the receiving circuits do not have to perform a non-trivial linear combination of signals, it is possible, when the electrical characteristics of the devices connected to the input of the transmitting circuits and to the output of the receiving circuits are suitable, that the transmitting circuits and/or the receiving circuits comprise no component.

In the case where the chosen coefficients $\alpha_i$ and $\beta_i$ of equations (4) to (13) are not real and frequency-independent, for instance when creating an equalization as explained below, the transmitting circuits and/or the receiving circuits have a filtering function. It then becomes necessary to synthesize the corresponding filters, either as analog filters or as digital filters, using one of the many methods known to specialists.

According to the prior art, the desired propagation of a signal on a single conductor corresponds to the propagation of several modes, at different propagation velocities, causing a modal dispersion well known to specialists. In the time domain, this modal dispersion distorts the signals. According to the invention, each signal is propagated using a single mode. There is therefore no modal dispersion, which increases the passband of the interconnection and the maximum length it may have.

Thus, according to the invention, in a transmission channel i, only one propagation constant $\gamma$ plays a part in the propagation of signals, as expressed by the equation (12). Moreover, the propagation constants applicable to the different transmission channels are equal to $\gamma$, thus leading to equal phase velocities, and therefore to equal propagation times between a given transmitting circuit and a given receiving circuit, for the different channels.

When the losses of the interconnection are negligible, the phase velocities associated with the propagation constants of the different transmission channels do not depend on the frequency, and the propagation along the interconnection produces delays in the different channels, without distortion of the propagated signals. This does not hold when the losses are not negligible. In this case, in a transmission channel i, the propagation constant $\gamma$ may correspond to a frequency-dependent phase velocity and a frequency-dependent attenuation constant, resulting in phase and amplitude distortions described by the equation (12), which are referred to as distortions caused by propagation. In a device for implementing the method of the invention, the distortions may be reduced using an equalization reducing the effects of the distortions caused by propagation, implemented in at least one of the transmitting circuits and/or one of the receiving circuits, on one or more transmission channels. This type of processing is well known to specialists, and is often implemented with digital signal processing, for example as explained in the above-mentionned French patent application no. 0302814. We note that implementing such an equalization requires frequency-dependent proportionality coefficients $\alpha_i$ and/or $\beta_i$, because the transfer function corresponding to the ideal equalization of a transmission channel i is an exponential function whose argument depends on $\gamma$.

Specialists know that it is commonplace to use adaptive algorithms for implementing this type of processing in receivers for data transmission.

A device for implementing the method of the invention may therefore implement, in at least one of the receiving circuits, an adaptive equalization for one or more transmission channels. This type of processing is well known to specialists, and is often implemented with digital signal processing, for example as explained in the above-mentioned French patent application no. 0302814. In this case, the proportionality coefficients $\beta_i$ are frequency-dependent and are adapted to minimize the distortion observed in the transmission channel.

BRIEF DESCRIPTION OF THE DRAWINGS

Other advantages and characteristics will appear more clearly from the following description of particular embodiments of the invention, given by way of non-limiting examples, with reference to the accompanying drawings in which.

DETAILED DESCRIPTION OF SOME EMBODIMENTS

First Embodiment

Figure 1:
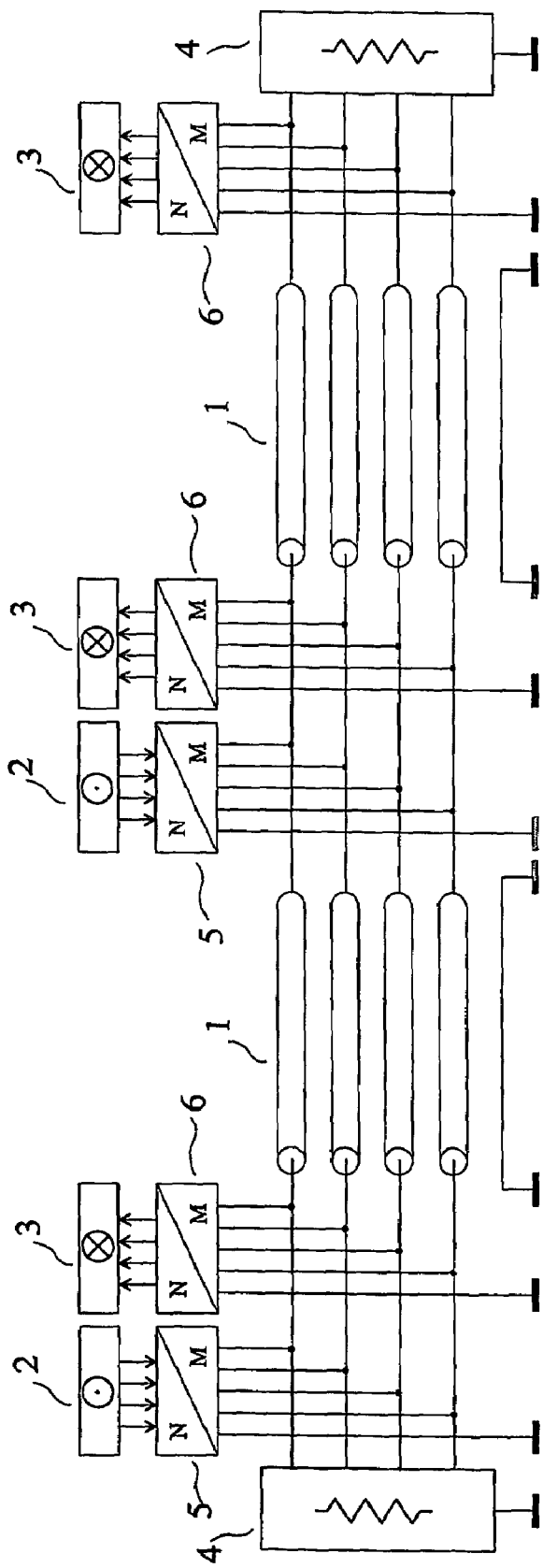
FIG. 1 shows a first embodiment of the invention.

As a first example of a device for implementing the method of the invention, given by way of non-limiting example, we have represented in FIG. 1 a device of the invention comprising an interconnection (1) having four parallel transmission conductors and one reference conductor, such that the propagation constants of its different propagation modes may be regarded as substantially equal in the frequency band used for the signals to be transmitted, which are analog signals in this case. Each end of the interconnection is connected to a termination circuit (4). For this device, the designer has chosen S equal to the identity matrix of order n, such that the natural electrical variables used are natural voltages.

Two transmitting circuits (5) placed at two different abscissa z, receive at their inputs the signals from the four channels of each of the two sources (2), these transmitting circuits (5) producing, when they are active, natural voltages, each being proportional to the signal of one channel. Note that this is a data bus architecture, and that the signals needed to obtain the active state of at most one transmitting circuit at a given time are not shown in FIG. 1. The three receiving circuits (6) placed at three different abscissa z, have their input terminals connected to the conductors of the interconnection, each of these receiving circuits (6) producing output signals being each proportional to a different natural voltage, at its output terminals connected to the destination (3). Thus, the signals of the four channels of a source (2), connected to an active transmitting circuit (5), are sent to the four channels of the destinations (3) without noticeable crosstalk.

In the device of FIG. 1, both termination circuits (4) are necessary because waves coming from the interconnection (1) may be incident on both ends. Taking into account the characteristics resulting from the proportioning of the interconnection and the spectrum of the signals to be transmitted, the designer has established that the losses may be ignored, and consequently used real and frequency-independent matrices for $Z_C$, S and T. The termination circuit (4) has therefore been designed as a simple network of 10 resistors.

Note that, in the device of FIG. 1, the transmitting circuits (5) and the receiving circuits (6), being connected in parallel with the interconnection (1), must present high impedances to the interconnection (1), in order not to disturb the propagation of waves along the interconnection in a detrimental way, and in order not to produce undesirable reflections at the ends of the interconnection (1). Thus, the transmitting circuits (5) almost behave like current sources, and the use of equation (5) is justified, which shows that the transmitting circuits (5) must combine the input signals according to non-trivial linear combinations, in order to inject in the transmission conductors the currents that produce the desired natural voltages. In this example, these linear combinations are obtained with conventional analog circuits mainly implementing fast operational amplifiers and resistors. The receiving circuits (6) operate according to the equation (6), and since no equalization is desired, each receiving circuit (6) need comprise only four high input impedance amplifiers. If the destinations (3) have suitable input characteristics, we see that the receiving circuits (6) could even comprise no component. In this example, we can state that the receiving circuits (6) are simpler than the transmitting circuits (5).

Second Embodiment (Best Mode)

Figure 2:
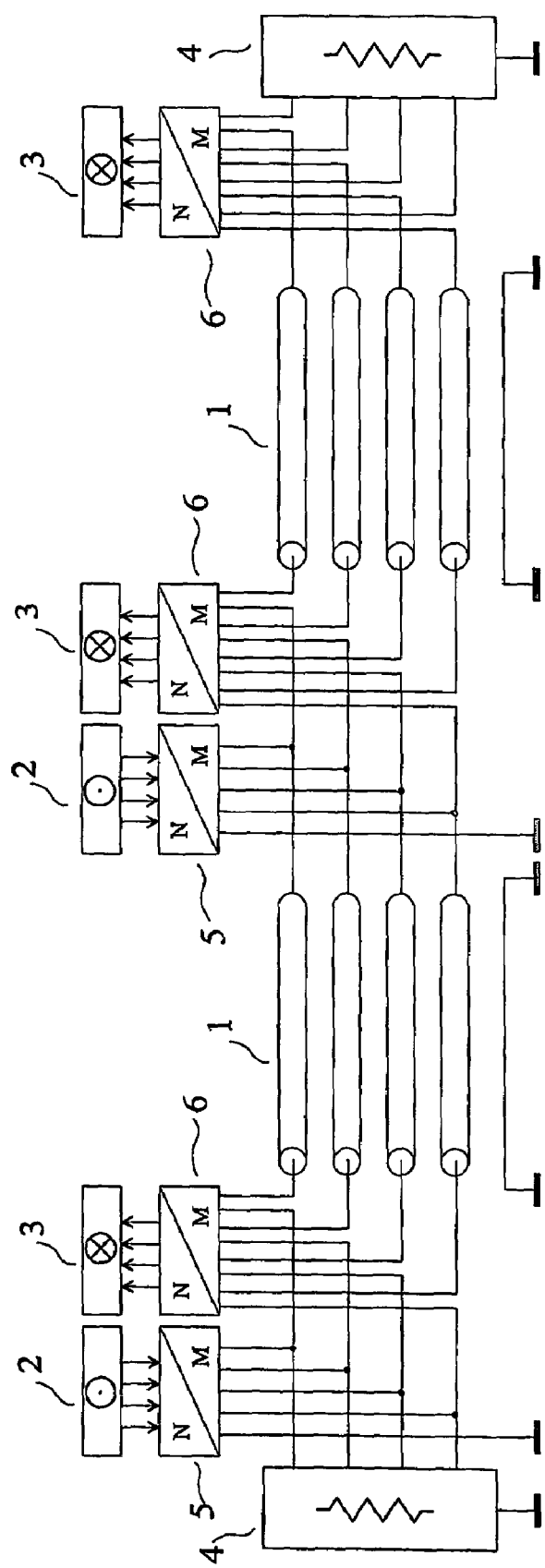
FIG. 2 shows a second embodiment of the invention (best mode).

As a second example of a device for implementing the method of the invention, given by way of non-limiting example and best mode of carrying out the invention, we have represented in FIG. 2 a device of the invention, comprising an interconnection (1) having four parallel transmission conductors, and one reference conductor, such that the propagation constants of its different propagation modes may be regarded as substantially equal in the frequency band used for the signals to be transmitted, which are digital signals. Each end of the interconnection is connected to a termination circuit (4). For this device, the designer has chosen T equal to the identity matrix of order n, such that the natural electrical variables used are natural currents.

Two transmitting circuits (5) placed at two different abscissa z, receive at their inputs the signals from the four channels of each of the two sources (2), these transmitting circuits (5) producing, when they are active, natural currents, each being proportional to the signal of one channel. Note that this is a data bus architecture, and that the signals needed to obtain the active state of at most one transmitting circuit at a given time are not shown in FIG. 2. The three receiving circuits (6) placed at three different abscissa z, have their input terminals connected to the conductors of the interconnection, each of these receiving circuits (6) producing output signals being each proportional to a different natural current, at its output terminals connected to the destination (3). Thus, the signals of the four channels of a source (2), connected to an active transmitting circuit (5), are sent to the four channels of the destinations (3) without noticeable crosstalk.

In the device of FIG. 2, both termination circuits (4) are necessary because waves coming from the interconnection (1) may be incident on both ends. Taking into account the characteristics resulting from the proportioning of the interconnection and the spectrum of the signals to be transmitted, the designer has established that the losses may be ignored, and consequently used real and frequency-independent matrices for $Z_C$, S and T. The termination circuit (4) has therefore been designed as a simple network of 9 resistors, using the possibility of reducing the number of parts of a termination circuit, as explained in the above-mentioned French patent application no. 0300064 and international application no. PCT/EP03/15036.

In the device of FIG. 2, the transmitting circuits (5), being connected in parallel with the interconnection (1), must present high impedances to the interconnection (1), in order not to disturb the propagation of waves along the interconnection in a detrimental way, and in order not to produce undesirable reflections at the ends of the interconnection (1). Thus, the transmitting circuits (5) almost behave like current sources, and the use of equation (8) is justified, which shows that each transmitting circuit (5) need comprise only four high output impedance amplifiers, since no equalization is desired.

In the device of FIG. 2, the receiving circuit (6), being connected in series with the interconnection (1), must present low series impedances to the interconnection (1), in order not to disturb the propagation of waves along the interconnection in a detrimental way, and in order not to produce undesirable reflections at the ends of the interconnection (1). Thus, the receiving circuits (6) may operate according to the equation (10), and since no equalization is desired, each receiving circuit (6) need comprise only four differential amplifiers providing a low impedance between the two nodes of a differential input, but a high impedance between different inputs.

We note that, in this example, neither the transmitting circuits (5) nor the receiving circuits (6) have to produce non-trivial linear combinations of signals. We note that the sign of the signals received by a receiving circuit depends on its position with respect to the active transmitting circuit. This characteristic might possibly require a specific processing.

INDICATIONS ON INDUSTRIAL APPLICATIONS

The invention is particularly suitable for cases where the transmission channels are used to send digital signals. In fact, in this case, a residual crosstalk coupling factor is acceptable, but the bandwidth to take into account is often very wide.

According to the invention, this result is easily obtained in an inexpensive way, because it is compatible with the use of resistors of average accuracy.

As shown with both embodiments, the invention is appropriate for an implementation wherein the interconnection is operated as a data bus.

The invention is particularly suitable for its implementation with microstrip structures and stripline structures, for instance on printed circuit boards. It is particularly beneficial to printed circuit boards comprising a wide band analog circuitry or fast digital circuits.

The invention is particularly suitable for reducing crosstalk in the internal interconnections of integrated circuits.

The invention is applicable in manufacturing computers that contain a large number of long interconnections for very fast signals.

The invention is also particularly suitable for reducing crosstalk in flat multiconductor cables. Flat cables used in a device of the invention could be used to send fast signals over long distances, for instance in applications such as local area networks and telecommunications.

The invention claimed is:

1. A method for transmitting through an interconnection with n transmission conductors and a reference conductor, n being an integer greater than or equal to 2, the method providing, in a known frequency band, m transmission channels each corresponding to a signal to be sent from an input of at least one transmitting circuit to an output of at least one receiving circuit, where m is an integer greater than or equal to 2 and less than or equal to n, the method comprising the steps of:

proportioning the interconnection, taking into account lumped impedances seen by the interconnection and caused by circuits connected to the interconnection elsewhere than at the ends of the interconnection, so as to be able to model the interconnection as a multiconductor transmission line having uniform electrical characteristics over the length of the multiconductor transmission line for the known frequency band, the electrical characteristics being such that propagation constants of different propagation modes are substantially equal in the known frequency band;

determining a characteristic impedance matrix of the multiconductor transmission line in the known frequency band;

placing at both ends of the interconnection a termination circuit having an impedance matrix approximating the characteristic impedance matrix, using one of the transmitting circuits to which m input signals are applied, so as to obtain at an output of said one of the transmitting circuits, the output being connected to at least m transmission conductors among the transmission conductors the generation of natural electrical variables, each being proportional to one of the input signals; and using one of the receiving circuits, the input of which is connected to at least m transmission conductors among the transmission conductors, so as to obtain, at the output of said one of the receiving circuits, m output signals each corresponding to one of the transmission channels, each of the m output signals being proportional to a single natural electrical variable among said natural electrical variables.

2. The method of claim 1, wherein said natural electrical variables are either all voltages or all electric currents.

3. A device for proportioning circuits used in a method for transmitting through an interconnection with n transmission conductors and a reference conductor, n being an integer greater than or equal to 2, the method providing, in a known frequency band, m transmission channels each corresponding to a signal to be sent from an input of at least one transmitting circuit to an output of at least one receiving circuit, where m is an integer greater than or equal to 2 and less than or equal to n, the device comprising:

means for proportioning the interconnection, taking into account lumped impedances seen by the interconnection and caused by circuits connected to the interconnection elsewhere than at the ends of the interconnection, so as to be able to model the interconnection as a multiconductor transmission line having uniform electrical characteristics over the length of the multiconductor transmission line for the known frequency band, the electrical characteristics being such that propagation constants of different propagation modes are substantially equal in the known frequency band;

means for determining a characteristic impedance matrix of the multiconductor transmission line in the known frequency band;

means for proportioning a termination circuit having an impedance matrix approximating the characteristic impedance matrix;

means for proportioning one of the transmitting circuits to which m input signals are applied, so as to obtain at an output of said one of the transmitting circuits, the output being connected to at least m transmission conductors among the transmission conductors, the generation of natural electrical variables, each being proportional to one of the input signals; and means for proportioning one of the receiving circuits, an input of which is connected to at least m transmission conductors among the transmission conductors' so as to obtain at the output of said one of the receiving circuits, m output signals each corresponding to one of the transmission channels, each of the m output signals being proportional to a single natural electrical variable among said natural electrical variables.

4. The device of claim 3, wherein the means for portioning the interconnection comprise means for measuring and/or for computing the real electrical characteristics of the interconnection, based on the relative layout of the transmission conductors end the reference conductor, and on the characteristics of dielectrics surrounding them.

5. The device of any of the claim 3, wherein the means for modeling the interconnection comprise:

means for calculating one or more error coefficients for variance between the actual electrical characteristics of the interconnection and desired characteristics, for the known frequency band, and means for optimizing the relative position of the transmission conductors and/or dielectrics surrounding them, by minimizing the error coefficient or coefficients.

6. A device for transmission providing, in a known frequency band, m transmission channels each corresponding to a signal to be sent from an input of at least one transmitting circuit to an output of at least one receiving circuit, where m is an integer greater than or equal to 2, the device comprising:

an interconnection with n transmission conductors and a reference conductor, being an integer greater than or equal to m, the interconnection being proportioned in such a way that the interconnection, taking into account lumped impedances seen by the interconnection and caused by the circuits connected to the interconnection elsewhere than at the ends of the interconnection, is modeled as a multiconductor transmission line having uniform electrical characteristics over the length of the multiconductor transmission line for the known frequency band, the electrical characteristics being such that propagation constants of different propagation modes are substantially equal in the known frequency band;

two termination circuits, each arranged at a different end of the interconnection and each having, in the known frequency band, an impedance matrix approximating a characteristic impedance matrix of the multiconductor transmission line;

at least one of the transmitting circuits to which the m input signals are applied, so as to obtain at the output of said one of the transmitting circuits, the output being connected to at least m transmission conductors among the transmission conductors' the generation of natural electrical variables, each being proportional to one of the input signals; and at least one of the receiving circuits, an input of which is connected to at least in transmission conductors among the transmission conductors, so as to obtain, at the output of said one of the receiving circuits, m output signals each corresponding to one of the transmission channels, each of the m output signals being proportional to a single natural electrical variable among said natural electrical variables.

7. The device of claim 6, wherein said natural electrical variables are either all voltages or all electric currents.

8. The device of claim 6, wherein the generation of the natural electrical variables is obtained at the output of the at least one transmitting circuit.

9. The device of claim 6, wherein the number m of transmission channels between any one of the transmitting circuits and any one of the receiving circuits is equal to the number n of transmission conductors.

10. The device of claim 6, wherein linear combinations of signals are performed in at least one of the transmitting circuits and/or in at least one of the receiving circuits, using an analog processing.

11. The device of claim 6, wherein linear combinations of signals are performed in at least one of the transmitting circuits and/or in at least one of the receiving circuits, using a digital processing.

12. The device of claim 11, wherein the digital processing performed in the at least one transmitting circuit and/or the digital processing performed in the at least one receiving circuit are defined by a program.

13. The device of claim 6, wherein the termination circuits are made of a network of resistors.

14. The device of claim 6, wherein the effects of distortions caused by propagation are reduced by an equalization implemented in at least one of the transmitting circuits and/or one of the receiving circuits, on one or more of the transmission channels.

15. The device of claim 6, wherein an adaptive equalization is implemented in at least one of the receiving circuits, for one or more of the transmission channels.

16. The device of claim 6, wherein the interconnection is operated as a data bus.

* * * * *